United States Patent
Wu

(10) Patent No.: US 10,422,417 B2
(45) Date of Patent: Sep. 24, 2019

(54) PULLEY ASSEMBLY FOR HIGH-SPEED CONTINUOUSLY VARIABLE TRANSMISSION

(71) Applicant: Wang-chang Wu, Miaoli (TW)

(72) Inventor: Wang-chang Wu, Miaoli (TW)

(73) Assignees: Wang-chang Wu, Miaoli County (TW); Huei Tuan, Miaoli County (TW); Pei-Hsuan Wu, Miaoli County (TW)

( * ) Notice: Subject to any disclaimer, the term of this patent is extended or adjusted under 35 U.S.C. 154(b) by 149 days.

(21) Appl. No.: 15/632,379

(22) Filed: Jun. 25, 2017

(65) Prior Publication Data
US 2017/0292590 A1 Oct. 12, 2017

(51) Int. Cl.
*F16H 9/12* (2006.01)
*F16H 55/56* (2006.01)
*F16H 61/66* (2006.01)

(52) U.S. Cl.
CPC ............. *F16H 9/12* (2013.01); *F16H 55/563* (2013.01); *F16H 61/66* (2013.01)

(58) Field of Classification Search
CPC ........... F16H 9/12; F16H 55/563; F16H 61/66
USPC ......................................................... 474/13
See application file for complete search history.

(56) References Cited

U.S. PATENT DOCUMENTS

| | | | | |
|---|---|---|---|---|
| 3,709,052 | A * | 1/1973 | Lassanske | F16H 55/563 192/105 B |
| 3,786,688 | A * | 1/1974 | Svenson | B62M 9/00 474/15 |
| 6,520,878 | B1 * | 2/2003 | Leclair | F16H 55/563 474/12 |
| 7,276,004 | B2 * | 10/2007 | Wu | F16H 55/563 474/13 |
| 9,518,641 | B2 * | 12/2016 | Mariotti | F16H 61/66245 |
| 2005/0090341 | A1 * | 4/2005 | Lohr | F16H 55/563 474/13 |
| 2005/0221927 | A1 * | 10/2005 | Chonan | B60K 17/02 474/15 |
| 2006/0258492 | A1 * | 11/2006 | Wu | F16H 55/563 474/13 |
| 2007/0105670 | A1 * | 5/2007 | Oishi | F16H 55/563 474/8 |
| 2009/0191993 | A1 * | 7/2009 | Lin | F16H 55/56 474/13 |
| 2014/0315670 | A1 * | 10/2014 | Mariotti | F16H 61/66245 474/12 |

(Continued)

*Primary Examiner* — William E Dondero
*Assistant Examiner* — Mark K Buse

(57) ABSTRACT

A pulley assembly for a high-speed continuously variable transmission includes a drive pulley, a shaft sleeve, a movable pulley, rollers, and a back pressure disc. The movable pulley has a shaft portion fitted on the shaft sleeve. The movable pulley has a disc chamber radially formed with multiple pairs of retaining wall pieces. A receiving room is defined between each pair of the retaining wall pieces. The bottom of the receiving room has an inclined push surface. The rollers are received in the receiving rooms. The back pressure disc includes a disc body having a complete inner conical surface. The back pressure disc is subject to the shaft sleeve and unable to be axially displaced along an output shaft. The peripheral edge of the disc body is embedded into the disc chamber of the movable pulley. The inner conical surface is pressed against the rollers.

3 Claims, 10 Drawing Sheets

(56) References Cited

U.S. PATENT DOCUMENTS

2015/0094176 A1\* 4/2015 Kakemizu .............. B62K 11/06
 474/8
2015/0111674 A1\* 4/2015 Yuan ........................ F16H 9/12
 474/14

\* cited by examiner

A-A

100 # PULLEY ASSEMBLY FOR HIGH-SPEED CONTINUOUSLY VARIABLE TRANSMISSION

FIELD OF THE INVENTION

The present invention relates to a pulley assembly, and more particularly to a pulley assembly for a flexible axial movement of a movable pulley on a shaft sleeve to effectively improve the smoothness and efficiency of the speed-change operation for a continuously variable transmission.

BACKGROUND OF THE INVENTION

An automatic variable transmission or continuously variable transmission for vehicles (such as motorcycles) is commercially available in a weight roller structure of automatic variable transmission device which comprises a movable transmission disc formed with a plurality of weight roller rooms. Each weight roller room is provided with a weight roller. Each weight roller is subject to a holding disc. Through the centrifugal outward displacement of the weight rollers, the movable transmission disc is forced to move toward a drive disc along a central shaft so that the distance between the movable transmission disc and the drive disc is reduced and changed and a V-shaped transmission belt between the movable transmission disc and the drive disc can change its transmission position with the speed of the movable transmission disc to achieve the effect of an automatic speed change.

For the aforesaid conventional automatic variable transmission or continuously variable transmission to achieve the object of a stepless automatic speed change, as shown in FIGS. 1, 2, 3 and 4, the center of a movable transmission disc 1 is radially formed with a plurality of weight roller rooms 11 each having a push surface 110 inclined inward. Each weight roller room 11 is provided with a weight roller 3. Each weight roller 3 on the push surface 110 is subject to an inclined disc body portion 20 of a holding disc 2. As shown in FIG. 5 and FIG. 6, when the drive disc 5 is driven by a central shaft 6, the movable transmission disc 1 is forced to move toward the drive disc 5 along the central shaft 6 through the centrifugal outward displacement of the weight rollers 3, so that the distance between the movable transmission disc 1 and the drive disc 5 is reduced and changed, and a V-shaped transmission belt 4 between the movable transmission disc 1 and the drive disc 5 can change its transmission position from inside to outside with the rotational speed of the movable transmission disc 1 to change the transmission speed ratio of the V-shaped transmission belt 4. As shown in FIG. 3 and FIG. 6, through the centrifugal outward displacement of the weight rollers 3, the movable transmission disc 1 is forced to move axially to change the distance between the movable transmission disc 1 and the drive disc 5 and further to change the transmission position of the V-shaped transmission belt 4. When the center shaft 6 drives the drive disc 5 and the holding disc 2, in order to prevent the weight rollers 3 from being displaced from the inclined disc body portion 20 of the holding disc 2, as shown in FIG. 1, FIG. 2 and FIG. 4, the movable transmission disc 1 is provided with a plurality of guide posts 12 extending outward and each disposed between every two of the weight roller rooms 11. In addition, the inclined disc body portion 20 of the holding disc 2 is formed with a plurality of recesses 200. The recesses 200 are formed with guide notches 21 corresponding to the guide posts 12. Through the guide posts 12 engaged in the guide notches 21 respectively, the holding disc 2 is synchronously rotated with the movable transmission disc 1, thereby preventing the press surface that the inclined disc body portion 20 of the holding disc 2 acts on the weight rollers 3 from being deviated. The holding disc 2 is not allowed to be axially displaced because the notches 21 are mated with the guide posts 12 of the movable transmission disc 1 to form a synchronous link. As a result, during the axial displacement of the movable transmission disc 1, a strong frictional resistance is formed between the guide posts 12 and the guide notches 21 to lower the flexibility of changing the distance between the movable transmission disc 1 and the drive disc 5. This affects the smoothness of the V-shaped transmission belt 4 to change its transmission position or affects the efficiency of a speed change. Accordingly, the inventor of the present invention has devoted himself based on his many years of practical experiences to solve these problems.

SUMMARY OF THE INVENTION

The primary object of the present invention is to provide a pulley assembly for a high-speed continuously variable transmission. The pulley assembly comprises a drive pulley, a shaft sleeve, a movable pulley, a plurality of rollers, and a back pressure disc. The drive pulley is connected with an output shaft and has a first belt acting disc surface inclined outward. The shaft sleeve is mounted on the output shaft. The movable pulley has a shaft portion fitted on the shaft sleeve, allowing the movable pulley to move axially along the shaft sleeve. One end of the movable pulley is formed with a second belt acting disc surface inclined outward opposite the first belt acting disc surface of the drive pulley. Another end of the movable pulley is formed with a disc rim around an outer periphery of the shaft portion to form a disc chamber. The disc chamber is radially formed with a plurality of pairs of retaining wall pieces extending in the direction of the disc rim with the shaft portion as a center thereof. A notch is formed between each pair of the retaining wall pieces and the disc rim. A receiving room is defined between each pair of the retaining wall pieces. A bottom of the receiving room, from the shaft portion to the disc rim, has an inclined push surface from deep to shallow. The rollers are received in the receiving rooms of the pairs of retaining wall pieces of the movable pulley, respectively. The back pressure disc has a disc body in the form of an Asian conical hat. The disc body has a complete inner conical surface and a coupling hole at an upper end thereof. The output shaft is inserted through the coupling hole. The back pressure disc is subject to the shaft sleeve and unable to be axially displaced along the output shaft. A peripheral edge of the disc body is embedded into the disc chamber of the movable pulley over the notch. The inner conical surface is pressed against the rollers. When the output shaft drives the drive pulley, the rollers are each displaced along the included push surface at the bottom of the receiving room of the movable pulley. The rollers, subject to the limitation of the axial displacement of the inner conical surface of the back pressure disc, force the movable pulley to move in the direction of the drive pulley, that is, the distance between the second belt acting disc surface of the movable pulley and the first belt acting disc surface of the drive pulley is reduced so that the triangular drive belt interposed between the first belt acting disc surface and the second belt acting disc surface changes its drive position. The movable pulley is axially moved back and forth on the shaft sleeve in response to the speed of the drive pulley. The back pressure disc does not directly interfere with the movable pulley so that the drive position of the triangular drive belt interposed between the first belt acting disc surface and the second belt acting disc surface is changed to achieve a flexible axial movement of the movable pulley on the shaft sleeve and to effectively improve the smoothness and efficiency of the speed-change operation for the continuously variable transmission.

DETAILED DESCRIPTION OF THE PREFERRED EMBODIMENTS

Embodiments of the present invention will now be described, by way of example only, with reference to the accompanying drawings.

Figure 12:
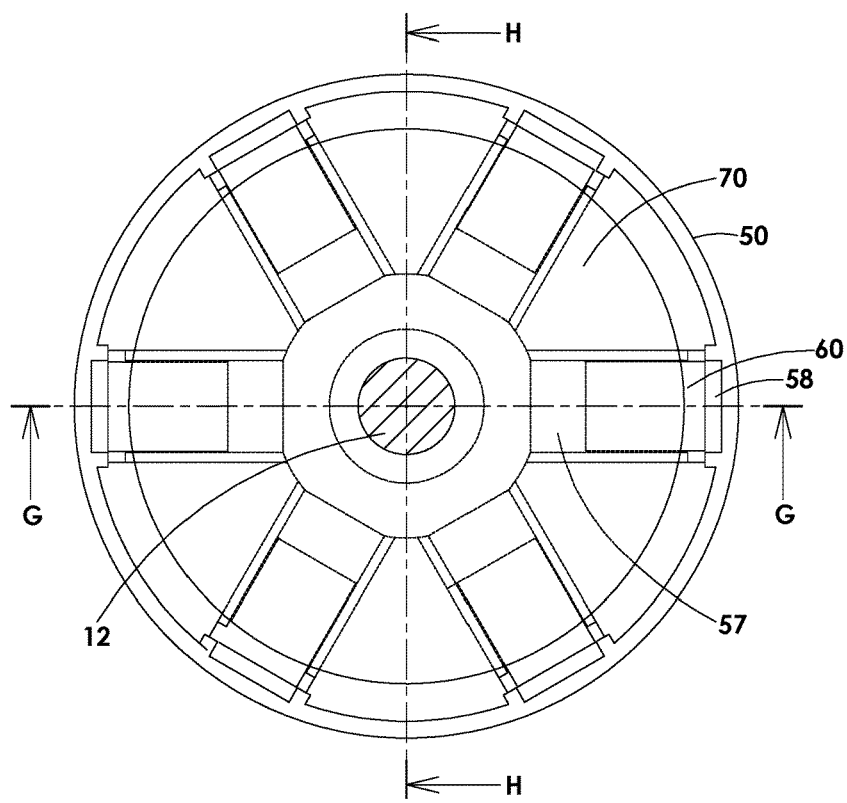
FIG. 12 is a planar view in accordance with the first embodiment of the present invention, showing that the rollers are centrifugally displaced.
Figure 13:
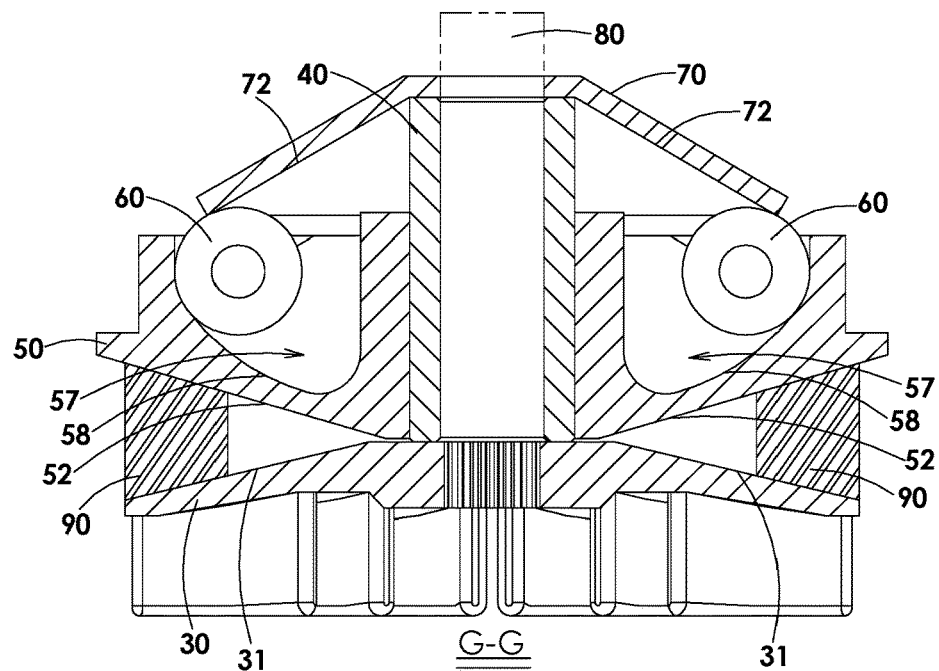
FIG. 13 is a sectional view taken along line G-G of FIG. 12.
Figure 14:
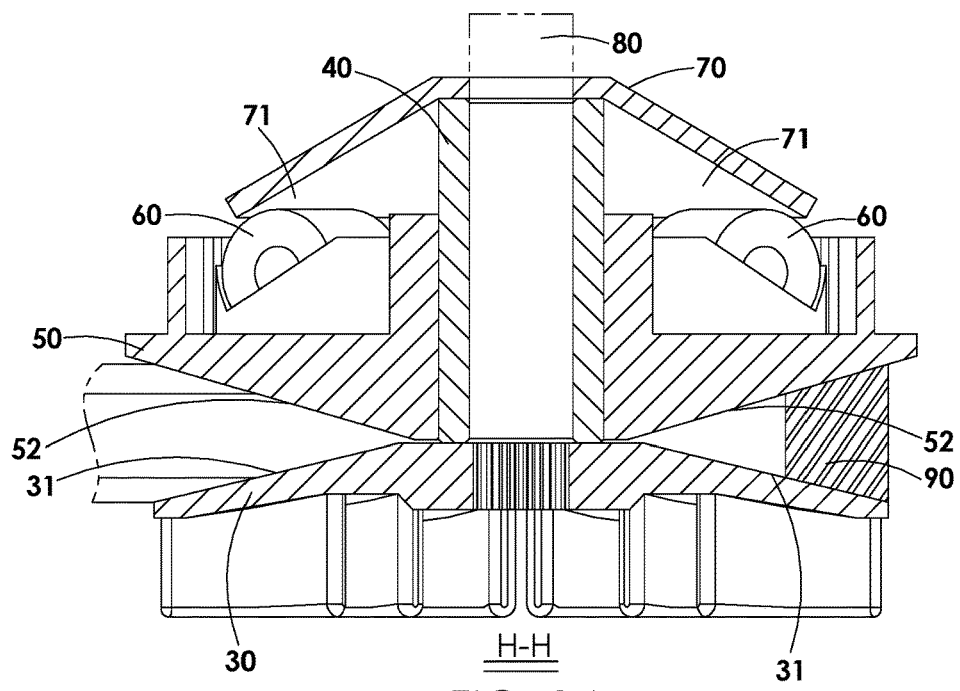
FIG. 14 is a sectional view taken along line H-H of FIG. 12.

A pulley assembly for a high-speed continuously variable transmission, as shown in FIGS. 8-11, comprises a drive pulley 30, a shaft sleeve 40, a movable pulley 50, a plurality of rollers 60, and a back pressure disc 70. The drive pulley 30 is connected with an output shaft 80, and has a first belt acting disc surface 31 inclined outward. The shaft sleeve 40 is mounted on the output shaft 80. The movable pulley 50 has a shaft portion 51 fitted on the shaft sleeve 40, allowing the movable pulley 50 to move axially along the shaft sleeve 40. One end of the movable pulley 50 is formed with a second belt acting disc surface 52 inclined outward opposite the first belt acting disc surface 31 of the drive pulley 30. Another end of the movable pulley 50 is formed with a disc rim around an outer periphery of the shaft portion 51 to form a disc chamber 54. The disc chamber 54 is radially formed with a plurality of pairs of retaining wall pieces 55 extending in the direction of the disc rim 53 with the shaft portion 51 as a center thereof. A notch 56 is formed between each pair of the retaining wall pieces 55 and the disc rim 53. A receiving room 57 is defined between each pair of the retaining wall pieces 55. The bottom of the receiving room 57, from the shaft portion 51 to the disc rim 53, has an inclined push surface 58 from deep to shallow. The rollers 60 are received in the receiving rooms 57 of the pairs of retaining wall pieces 55 of the movable pulley 50, respectively. The back pressure disc 70 has a disc body 71 in the form of an Asian conical hat. The disc body 71 has a complete inner conical surface 72 and a coupling hole 73 at an upper end thereof. The output shaft 80 is inserted through the coupling hole 73. In cooperation with the limitation or stop of the shaft sleeve 40, the back pressure disc 70 can't be axially displaced along the output shaft 80. The peripheral edge of the disc body 71 is embedded into the disc chamber 54 of the movable pulley 50 over the notch 56, without any blocking. The inner conical surface 72 is pressed against a surface of each roller 60. As shown in FIG. 12, FIG. 13 and FIG. 14, when the output shaft 80 drives the drive pulley 30, the rollers 60 are each displaced along the included push surface 58 at the bottom of the receiving room 57 of the movable pulley 50. The rollers 60, subject to the limitation of the axial displacement of the integral inner conical surface 72 of the back pressure disc 70, force the movable pulley 50 to move in the direction of the drive pulley 30, that is, the distance between the second belt acting disc surface 52 of the movable pulley 50 and the first belt acting disc surface 31 of the drive pulley 30 is reduced so that the triangular drive belt 90 interposed between the first belt acting disc surface 31 and the second belt acting disc surface 52 changes its drive position, generating an automatic and stepless speed change of the transmission speed ratio. As shown in FIGS. 10, 11, 13, and 14, the movable pulley 50 is axially moved back and forth on the shaft sleeve 40 in response to the speed of the drive pulley 30. The back pressure disc 70 does not directly interfere with the movable pulley 50 so that the drive position of the triangular drive belt 90 interposed between the first belt acting disc surface 31 and the second belt acting disc surface 52 is changed to achieve a flexible axial movement of the movable pulley 50 on the shaft sleeve 40 and to effectively improve the smoothness and efficiency of the speed-change operation for the continuously variable transmission.

Figure 1:
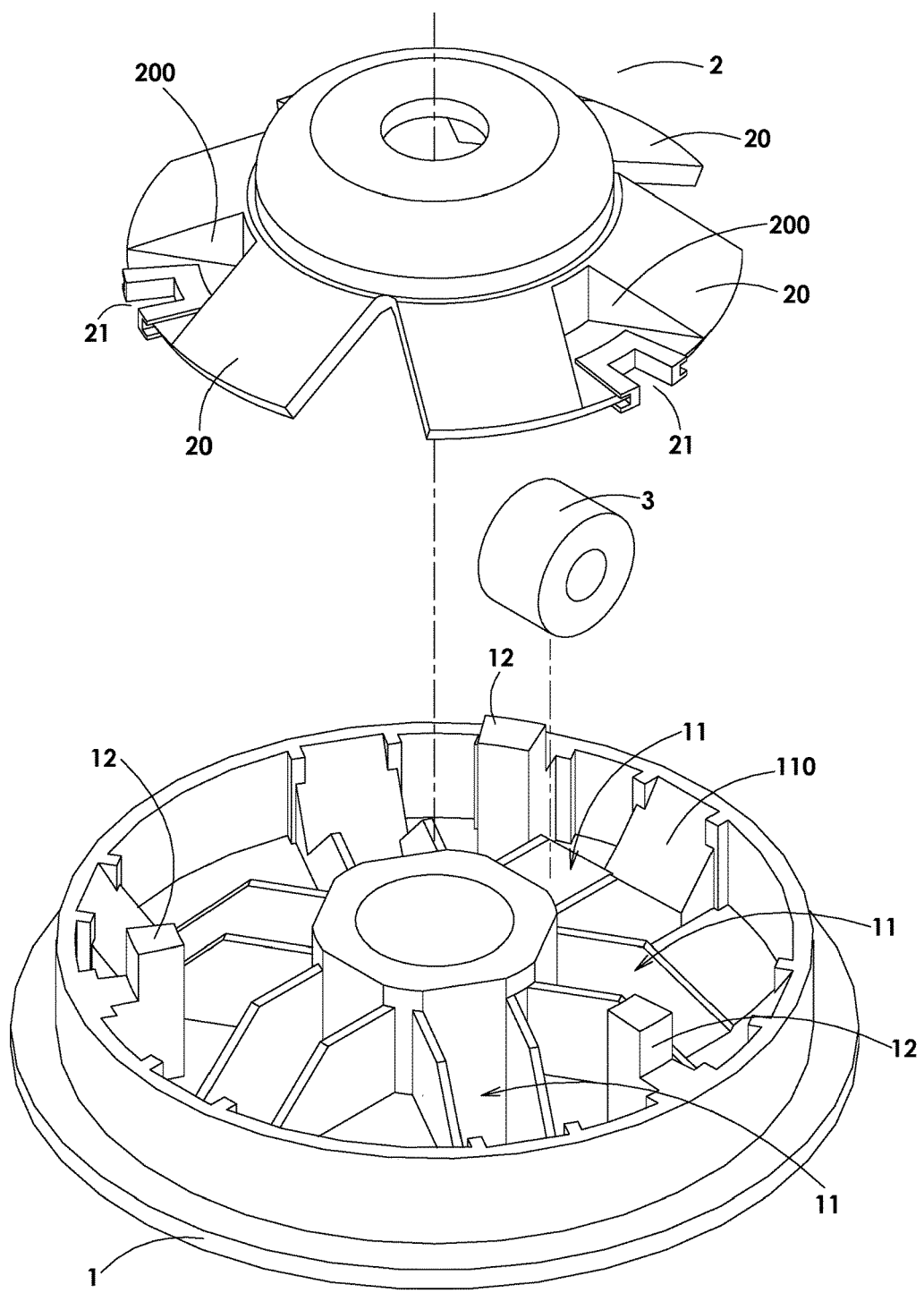
FIG. 1 is an exploded view of a conventional pulley assembly for a continuously variable transmission.
Figure 2:
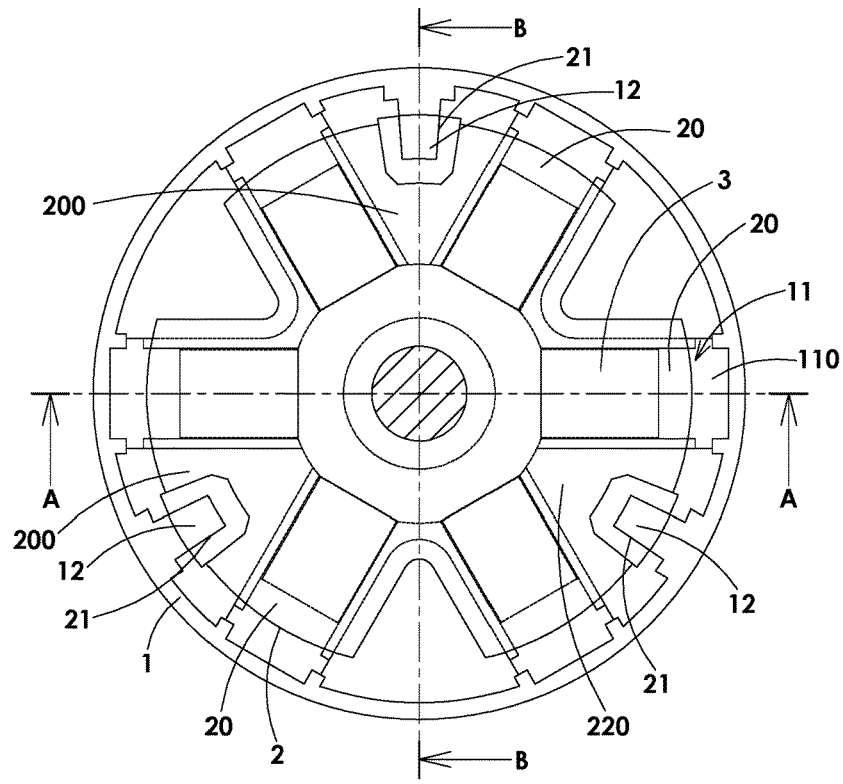
FIG. 2 is a planar view of the conventional pulley assembly of FIG. 1.
Figure 3:
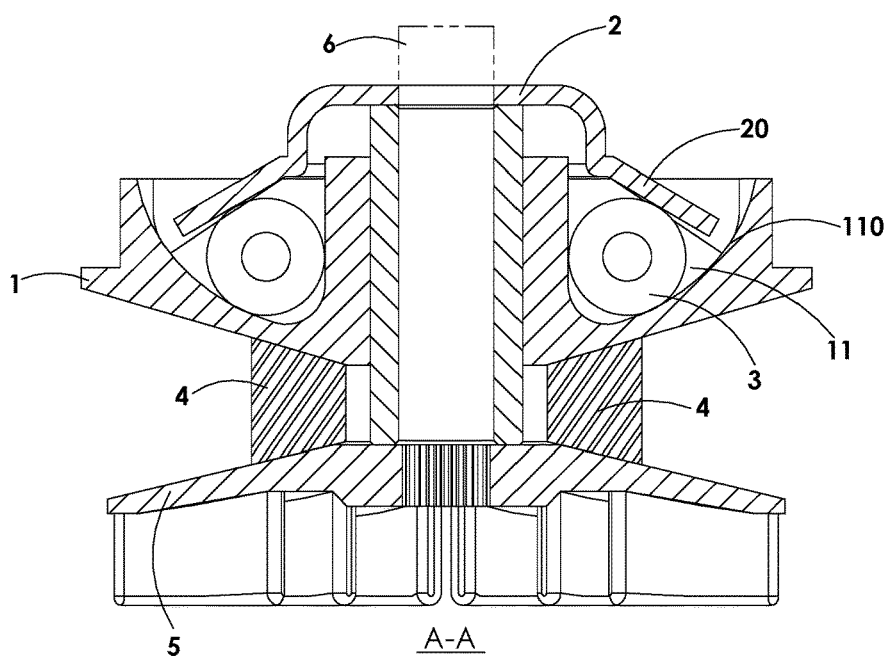
FIG. 3 is a sectional view taken along line A-A of FIG. 2.
Figure 4:
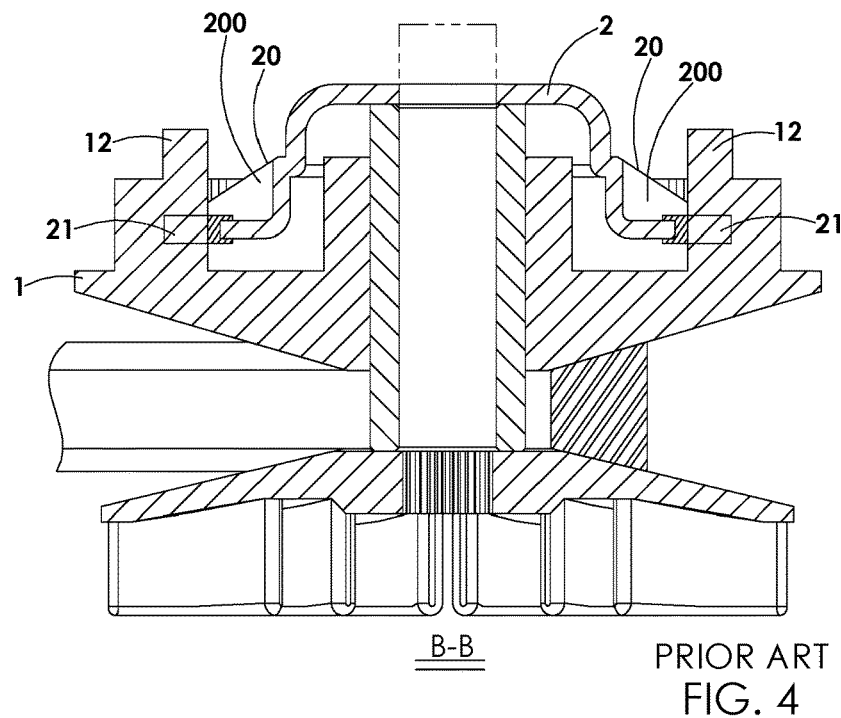
FIG. 4 is a sectional view taken along line B-B of FIG. 2.
Figure 5:
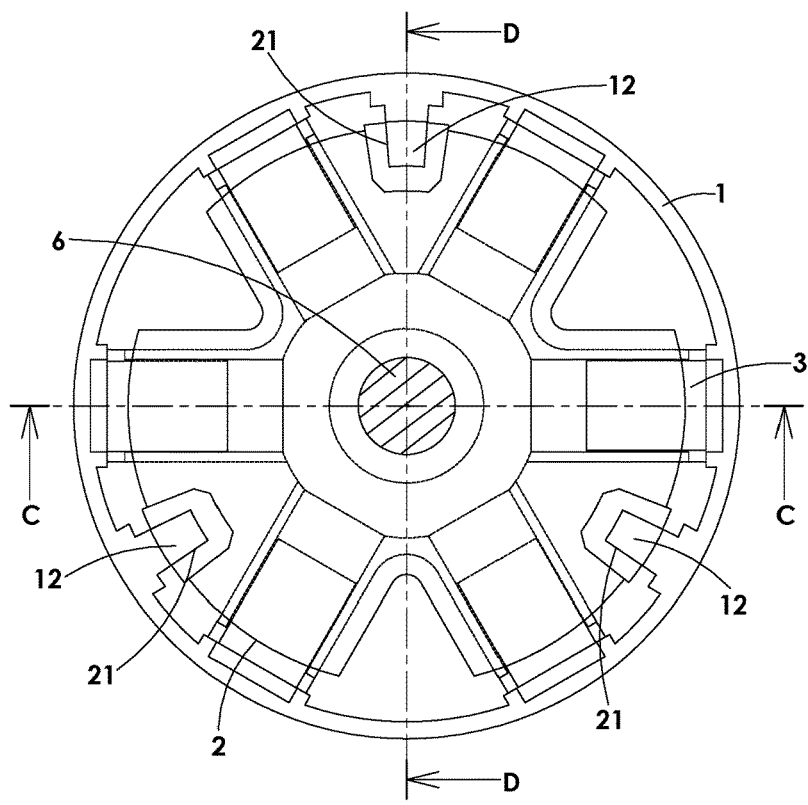
FIG. 5 is a schematic view showing the centrifugal displacement of the weight rollers of the conventional pulley assembly of FIG. 1.
Figure 6:
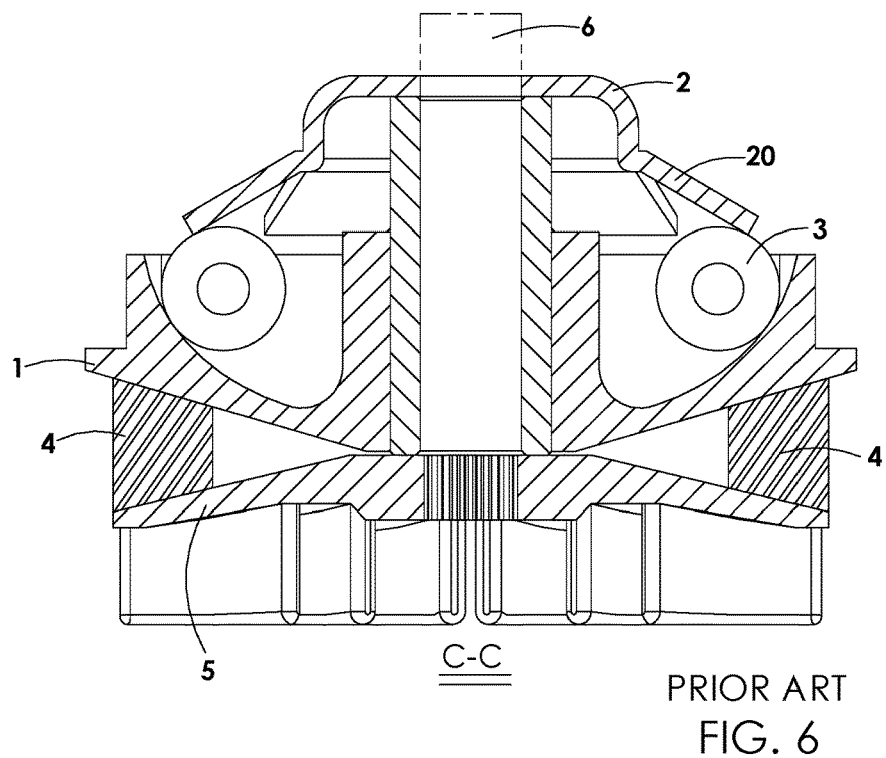
FIG. 6 is a sectional view taken along line C-C of FIG. 5.
Figure 7:
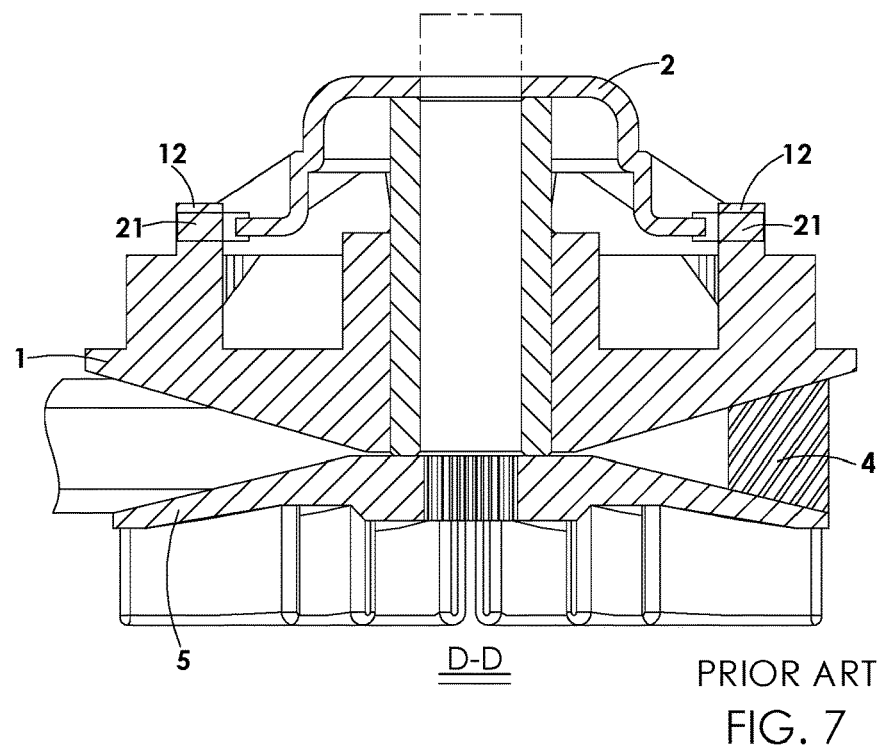
FIG. 7 is a sectional view taken along line D-D of FIG. 5.
Figure 8:
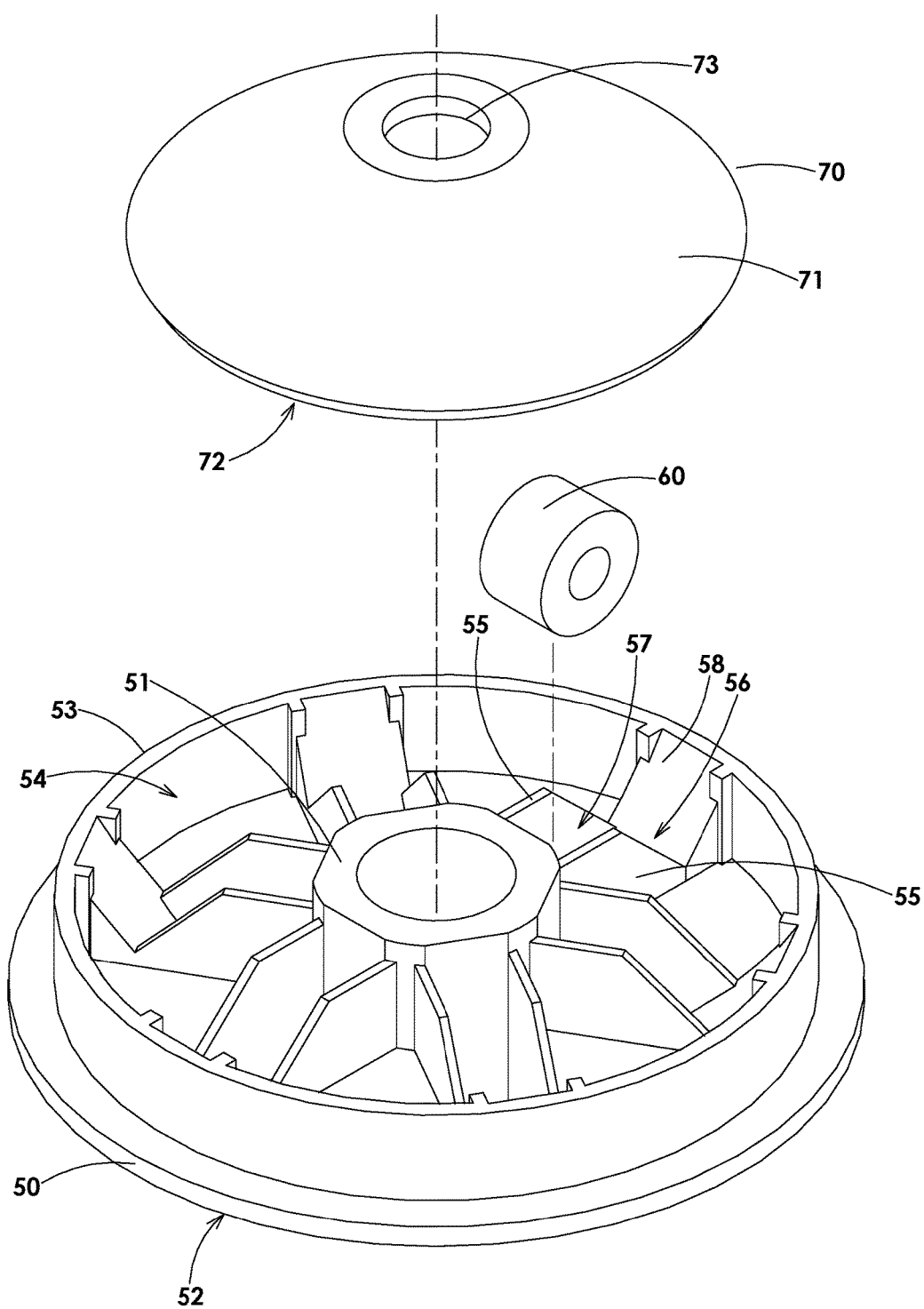
FIG. 8 is an exploded view in accordance with a first embodiment of the present invention.
Figure 9:
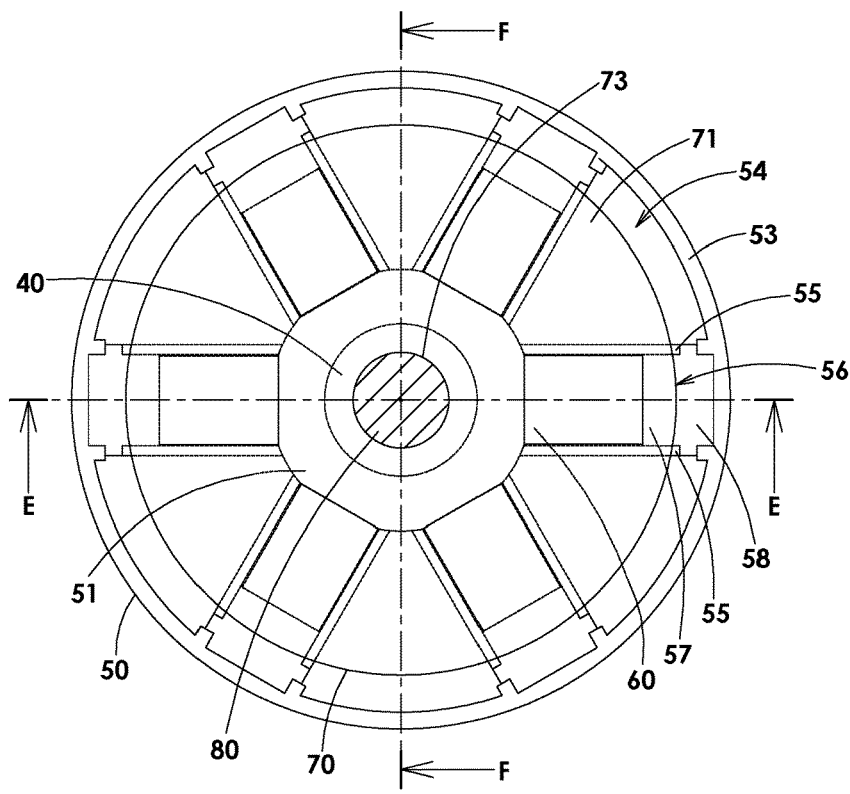
FIG. 9 is a planar view in accordance with the first embodiment of the present invention.
Figure 10:
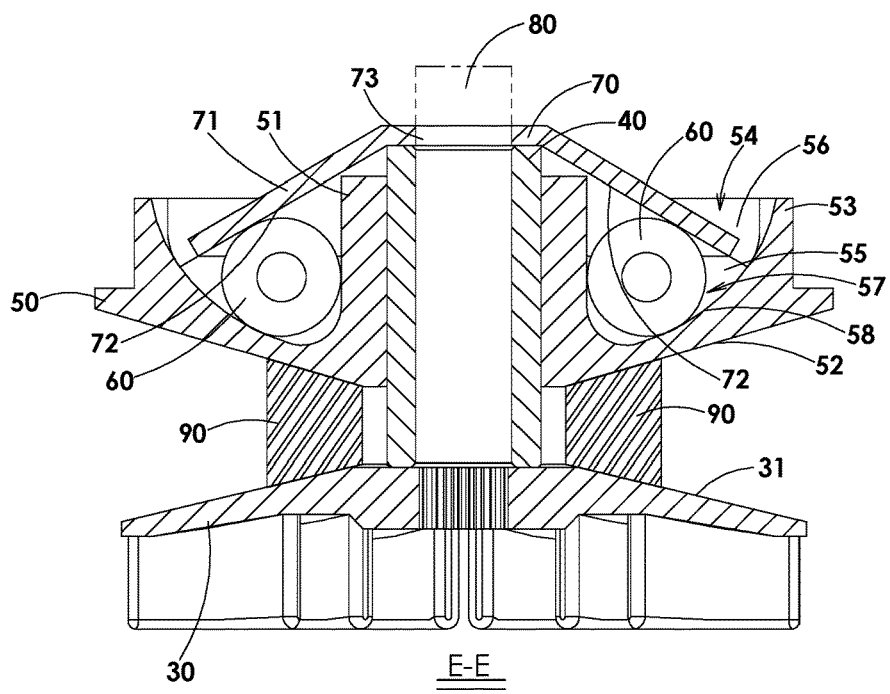
FIG. 10 is a sectional view taken along line E-E of FIG. 9.
Figure 11:
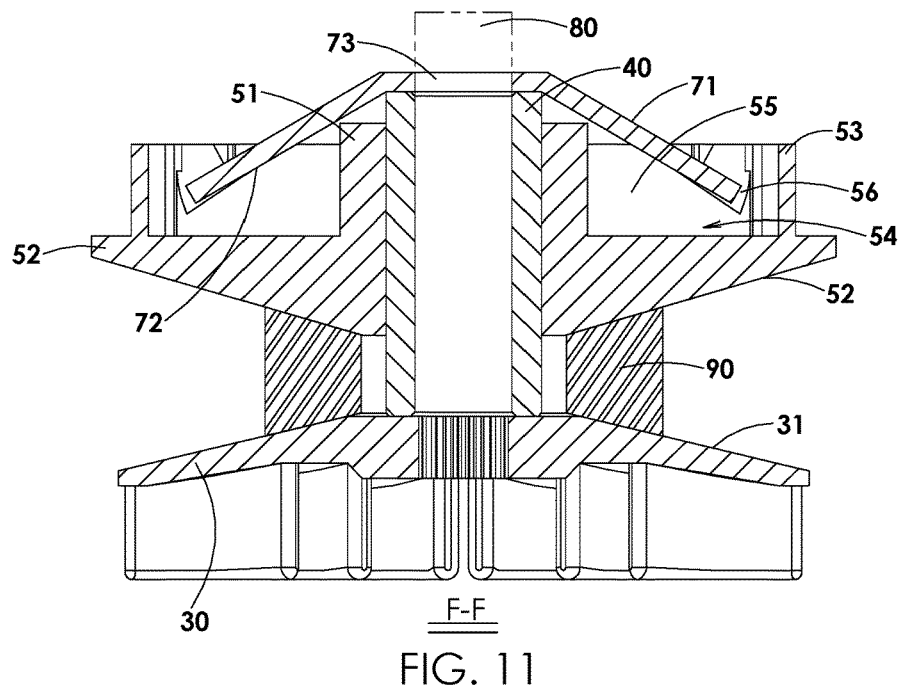
FIG. 11 is a sectional view taken along line F-F of FIG. 9.
Figure 15:
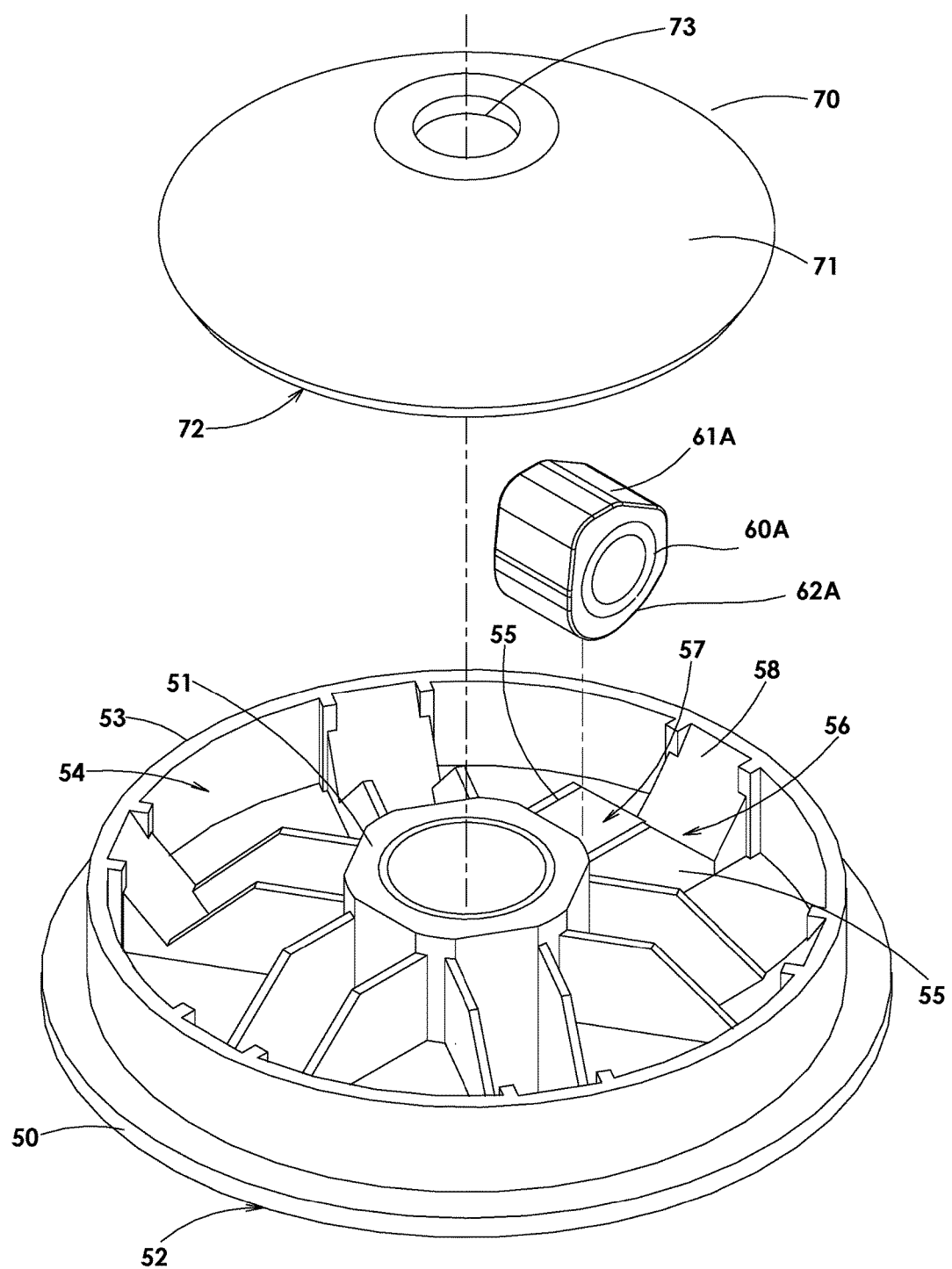
FIG. 15 is an exploded view in accordance with a second embodiment of the present invention.
Figure 16:
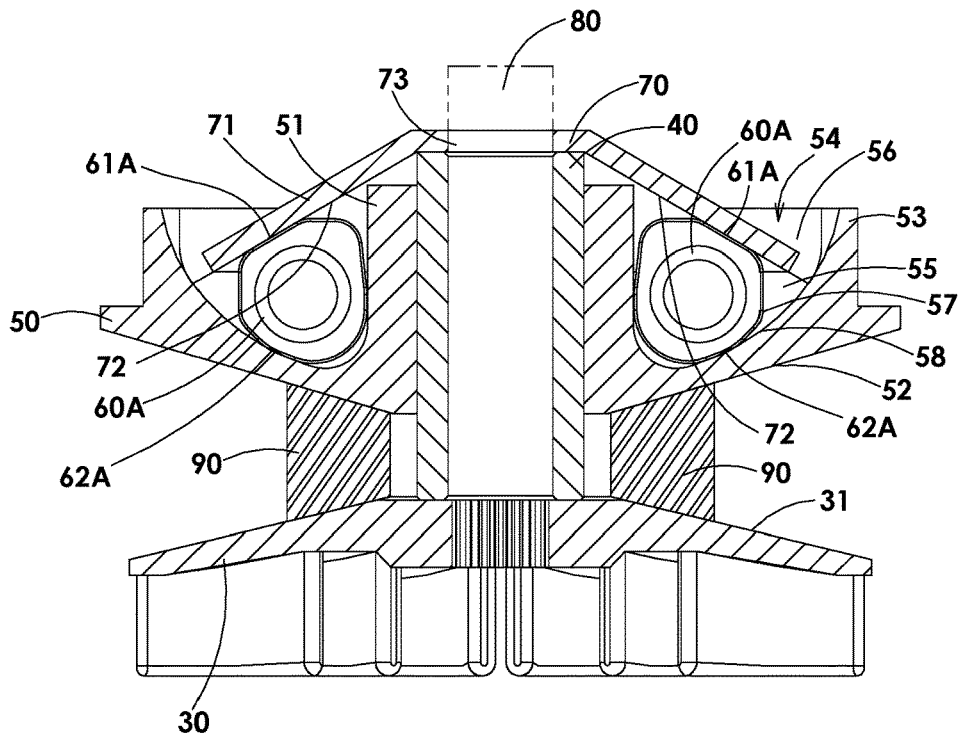
FIG. 16 is a sectional view in accordance with the second embodiment of the present invention.
Figure 17:
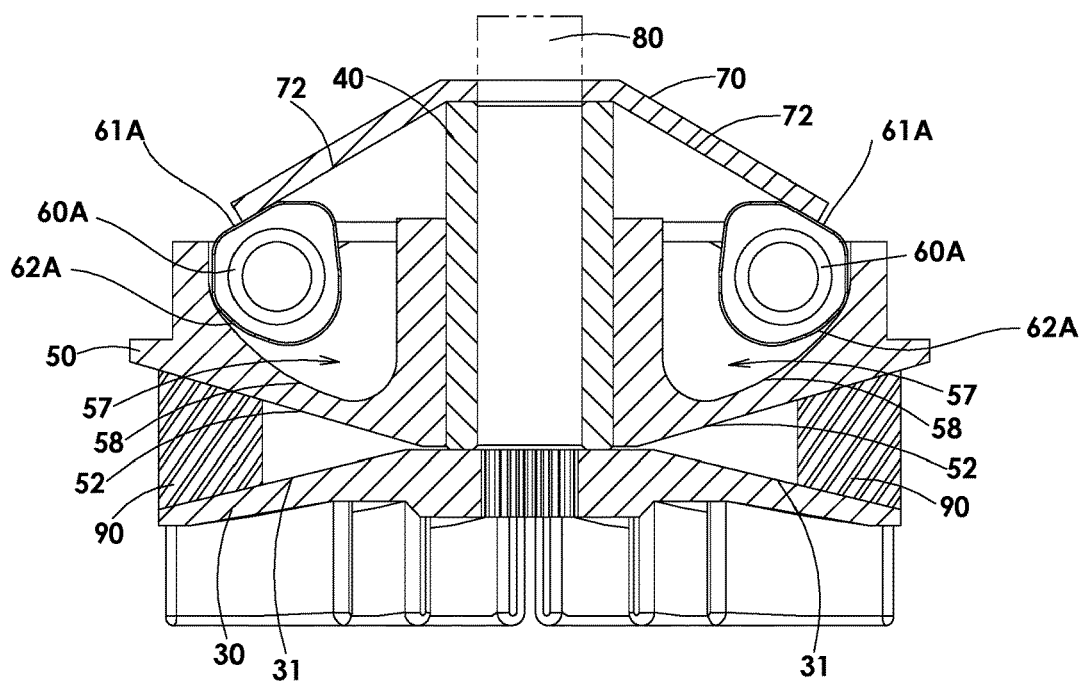
FIG. 17 is a sectional view in accordance with the second embodiment of the present invention, showing that the rollers are centrifugally displaced.

According to the above-described embodiment, as shown in FIGS. 8, 9 and 10, the roller 60 may be a circular roller, or it may be a polygonal roller as shown in FIGS. 15 and 16. Please note that the polygonal roller can refer to the teaching disclosed in Taiwan Patent No. I308122 titled "weight roller for automatic variable transmission device" or Taiwan Utility Model No. M425094 titled "anti-roll weight roller structure for automatic variable transmission". The inner conical surface 72 of the back pressure disc 70 is pressed against an inclined surface 61A of each polygonal roller 60A. As shown in FIG. 16 and FIG. 17, when the output shaft 80 drives the drive pulley 30, a slide curved surface 62A of each polygonal roller 60A is displaced along the included push surface 58 at the bottom of the receiving room 57 of the movable pulley 50. The polygonal rollers 60, subject to the limitation of the axial displacement of the integral inner conical surface 72 of the back pressure disc 70, force the movable pulley 50 to move in the direction of the drive pulley 30, that is, the distance between the second belt acting disc surface 52 of the movable pulley 50 and the first belt acting disc surface 31 of the drive pulley 30 is reduced to generate an automatic and stepless speed change of the transmission speed ratio. Similarly, the back pressure disc 70 does not directly interfere with the movable pulley 50 to achieve a flexible axial movement of the movable pulley 50 on the shaft sleeve 40. Through a speed-change rate test on a motorcycle, the results are shown in Table 1 and Table 2. (Note: The data of Table 1 and Table 2 are quoted from the test report of Appendix I.

TABLE 1 the record of the required time for acceleration at the predetermined speed

| speed Speed per hour (Kmh) | record at the predetermined speed, the time displayed by the timer (minute/second) | |
| --- | --- | --- |
| | the pulley assembly of the present invention | the conventional pulley assembly |
| 30 | 01:39 | 01:50 |
| 40 | 01:41 | 01:52 |
| 50 | 01:42 | 01:55 |
| 60 | 01:44 | 01:58 |
| 70 | 01:48 | 02:02 |
| 80 | 01:52 | 02:06 |
| 90 | 02:04 | 02:19 |

TABLE 2 the required time for acceleration and comparison

| speed per hour (Kmh) section | the required time for acceleration at the predetermined section (second) | | acceleration at the predetermined section (speed rate) |
| --- | --- | --- | --- |
| | the pulley assembly of the present invention | the conventional pulley assembly | comparison between the pulley assembly of the present invention and the conventional pulley assembly |
| 30-40 | 2 | 2 | the same |
| 30-50 | 3 | 5 | 2 seconds faster |
| 30-60 | 5 | 8 | 3 seconds faster |
| 30-70 | 9 | 12 | 3 seconds faster |
| 30-80 | 13 | 16 | 3 seconds faster |
| 30-90 | 25 | 29 | 4 seconds faster |

The data of the test results show that the required time for the pulley assembly of the present invention to be accelerated from 30 km per hour to 90 km per hour is about 4 seconds faster than that of a conventional pulley assembly, which proves that the pulley assembly of the present invention can effectively improve the smoothness of the speed-change operation and the reaction rate of the continuously variable transmission. In addition, as shown in the test report of the Appendix I, it is confirmed that the pulley assembly of the present invention also has the benefits of saving fuel and reducing the wear of the rollers.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A pulley assembly for a high-speed continuously variable transmission, comprising a drive pulley, a shaft sleeve, a movable pulley, a plurality of rollers, and a back pressure disc; the drive pulley being connected with an output shaft and having a first belt acting disc surface inclined outward; the shaft sleeve being mounted on the output shaft, the movable pulley having a shaft portion fitted on the shaft sleeve, allowing the movable pulley to move axially along the shaft sleeve, one end of the movable pulley being formed with a second belt acting disc surface inclined outward opposite the first belt acting disc surface of the drive pulley, another end of the movable pulley being formed with a disc rim around an outer periphery of the shaft portion to form a disc chamber, the disc chamber being radially formed with a plurality of pairs of retaining wall pieces extending in the direction of the disc rim with the shaft portion as a center thereof, a notch being formed between each pair of the retaining wall pieces and the disc rim, a receiving room being defined between each pair of the retaining wall pieces, a bottom of the receiving room, from the shaft portion to the disc rim, having an inclined push surface from deep to shallow; the rollers being received in the receiving rooms of the pairs of retaining wall pieces of the movable pulley respectively; the back pressure disc having a disc body in the form of an Asian conical hat, the disc body having a complete inner conical surface and a coupling hole at an upper end thereof, the output shaft being inserted through the coupling hole, the back pressure disc being in cooperation with a limitation of the shaft sleeve and unable to be axially displaced along the output shaft, a peripheral edge of the disc body being embedded into the disc chamber of the movable pulley over the notch, and the rollers are installed in the receiving room, and are between inner conical surface and inclined push surface, and the rollers are pressed against the inner conical surface.

2. The pulley assembly for a high-speed continuously variable transmission as claimed in claim 1, wherein the rollers are circular rollers.

3. The pulley assembly for a high-speed continuously variable transmission as claimed in claim 1, wherein the rollers are polygonal rollers.

* * * * *